J. A. DAVIS.
COMBINATION GARDEN AND FARM TOOL.
APPLICATION FILED APR. 13, 1914.
1,129,338.
Patented Feb. 23, 1915.
2 SHEETS—SHEET 1.
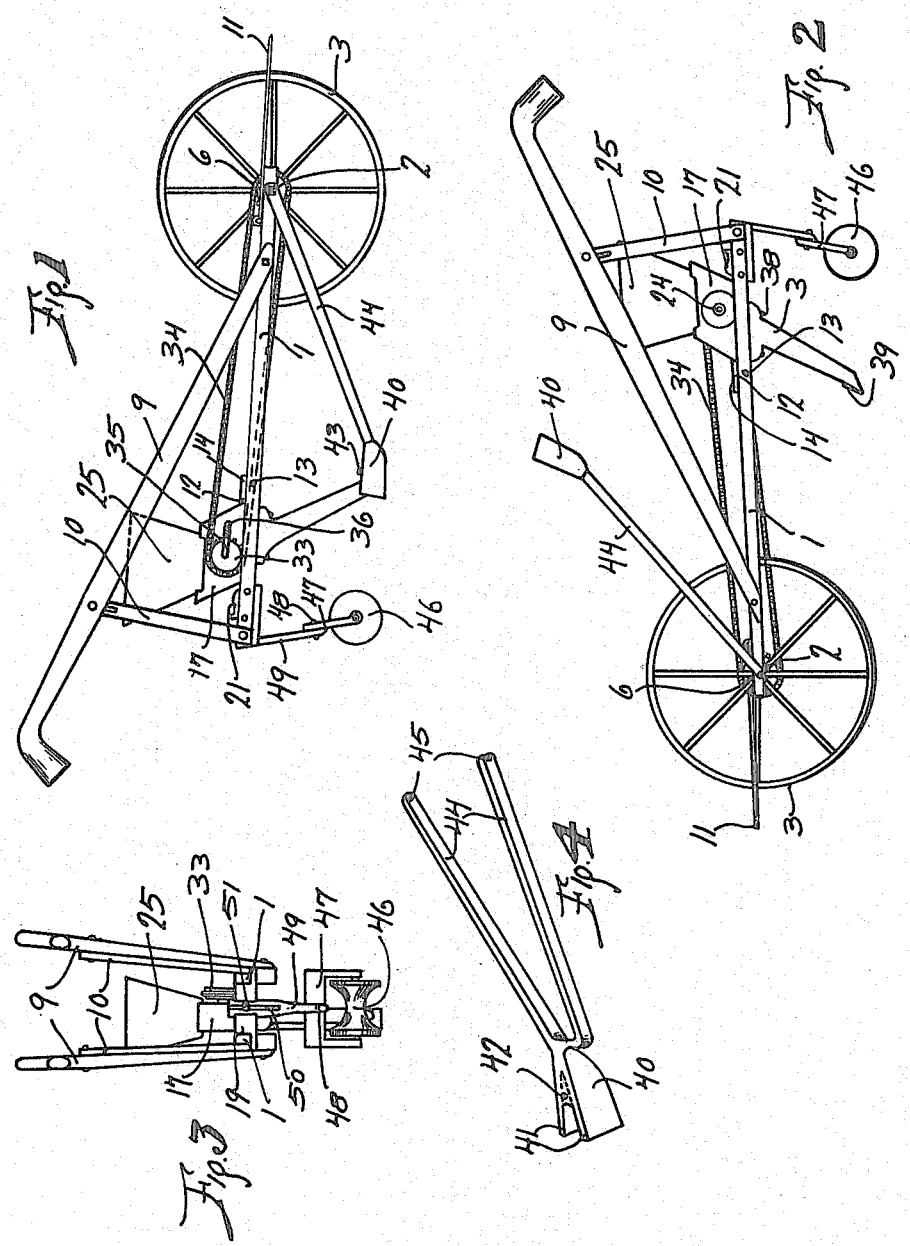
Inventor
John A. Davis
Witnesses
Harold Scantlebury
Ansley Strom
By Herbert E. Smith
Attorney J. A. DAVIS.
COMBINATION GARDEN AND FARM TOOL.
APPLICATION FILED APR. 13, 1914.
1,129,338.
Patented Feb. 23, 1915.
2 SHEETS—SHEET 2.
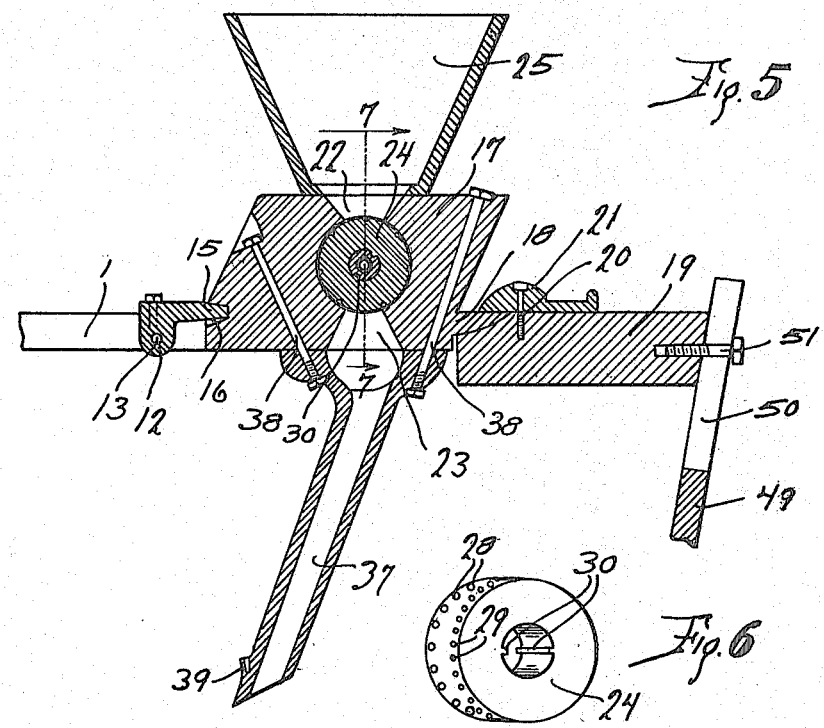
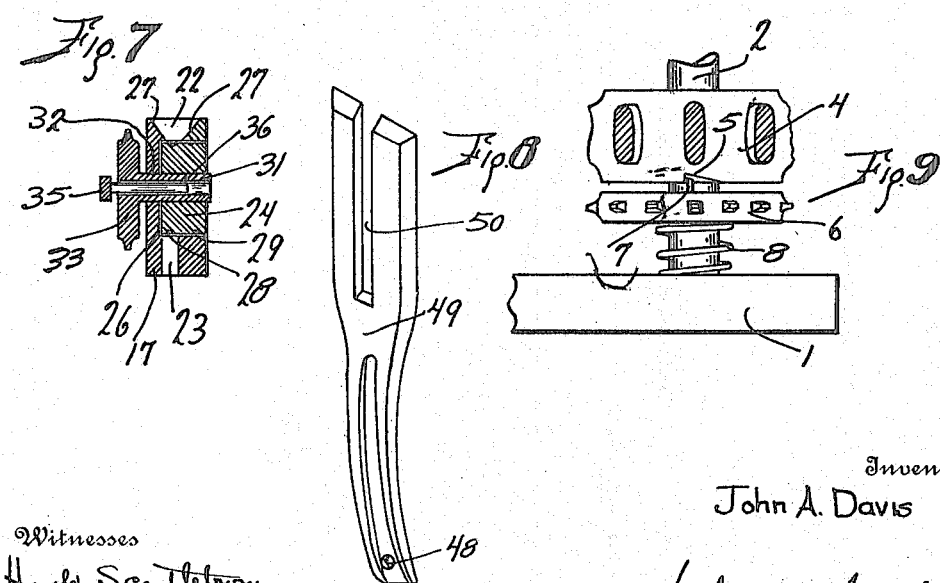
Witnesses
Harold Scantlebury
Ansley Strom
Inventor
John A. Davis
By Herbert E. Smith
Attorney

UNITED STATES PATENT OFFICE.

JOHN A. DAVIS, OF SPOKANE, WASHINGTON.

COMBINATION GARDEN AND FARM TOOL.

1,129,338.  Specification of Letters Patent.  Patented Feb. 23, 1915.

Application filed April 13, 1914. Serial No. 831,512.

*To all whom it may concern:*

Be it known that I, JOHN A. DAVIS, a citizen of the United States, residing at Spokane, in the county of Spokane and State of Washington, have invented new and useful Improvements in Combination Garden and Farm Tools, of which the following is a specification.

This invention relates to improvements in agricultural apparatus and has to do more particularly with an improved form of seeder which is especially adapted for garden work but which may be readily and advantageously applied to field work.

It is one of the objects of this invention to provide a drill frame which is adapted to be mounted upon or rather supported by a bearing wheel, the drill frame being equipped with a drill block or body having intake and discharge portions between which is interposed a cylinder for consecutively delivering seed to the conducting tube.

A further object is to connect a drill shoe to the conducting tube and attached to the toe of the drill shoe, an earth spreading and protecting shoe of novel construction.

Further objects of the invention will be more fully described in connection with the accompanying drawings and will be more particularly pointed out in and by the appended claims.

In the drawings: Figure 1 is a view in side elevation of a seeder embodying one form of my invention. Fig. 2 is a view in elevation looking from the opposite side. Fig. 3 is a rear end elevation. Fig. 4 is a perspective view of my improved furrow opening shoe. Fig. 5 is a vertical sectional view taken through the seeder body and hopper. Fig. 6 is a perspective view of my improved seeder cylinder. Fig. 7 is a sectional view on line 7—7 of Fig. 5. Fig. 8 is a detached perspective view of an adjustable hanger. Fig. 9 is a detail plan view showing the manner in which the bearing wheel is operatively connected to drive the seeder cylinder.

Like characters of reference designate similar parts throughout the different figures of the drawings.

As illustrated, the device of my invention includes longitudinally extending frame members 1 in which an axle or shaft 2 is journaled, at the forward ends of said members. A bearing wheel 3 is fixed upon the axle 2 and is provided with a hub 4 in one side of which clutch notches 5 are formed.

A sprocket wheel 6 is loosely disposed on the shaft 2 and is provided with a clutch member 7 adapted for engagement by the clutch notch 5 to rotate the sprocket wheel 6 when the seeder is being advanced. The clutch notch 5 is so formed that the clutch member 7 will slide out of the notch on backward movement of the seeder. In order to maintain the sprocket wheel 6 in operative relation with the hub 4 I interpose a spring 8 between one of the frame members 1 and the sprocket wheel.

Handle bars 9 are secured to the frame members 1 at the forward ends of the former, and near the rear ends, said handle bars 9 are supported by braces 10. A draft attachment 11 may be applied to the seeder for field work when a horse is used but in garden work the seeder may be advanced by a thrust on the handle bars. I attach to the frame members 1, a cross bar 12 which may be secured by means of a tie-bolt 13, extending thereto and through the frame members 1. The cross bar 12 may be provided with flanged ends 14 adapted to overlap the frame members 1 so that the cross bar will be firmly held. The cross bar 12 is provided with a lug 15 which projects into a recess 16 in the seeder body or block 17, to support the latter on the seeder frame. The block 17 is provided with a supporting lug 18 which overhangs a tie-bar 19, secured to the frame 1. I pivot on the tie-bar 19, at 20, a retaining catch 21 which is adapted to be moved into overhanging relation with the lug 18, to hold the seeder body in position, and which may be shifted about its pivot to release lug 18 when it is desired to remove the seeder body.

The seeder body 17 is provided with intake and discharge portions 22 and 23, respectively, and between said portions the body 17 is shaped to receive a seeder cylinder 24 whereby passage of seeds may be controlled through the body 17. A hopper 25 may be disposed on the body 17 to deliver to the intake portion 22. The bore provided in the body 17 for the cylinder 24 only extends a portion of the way through said body and is open at one side thereof for insertion and withdrawal, and also for reverse or end to end positioning of the cylinder in said bore. The closed end 26, of the bore, serves as a gaging abutment to limit movement of the cylinder beneath the converging walls 27 of the intake portion 22 in such a manner as to dispose the left hand portion 27, as shown in Fig. 7, in overhanging relation with respect to the cylinder 24 so as to guide the seeds into pockets formed in the periphery of the cylinder. In Fig. 6, I have shown two rows of pockets one designated at 28 for relatively large seeds, and the other designated at 29 for relatively small seeds. The pockets are so disposed with respect to the ends of the cylinder that when the same is inserted with the left hand end against the gaging abutment 26, the pockets 28 will be exposed for ingress thereto of seeds through intake portion 22 and the pockets 29 will be disposed out of alinement with said intake portion. By reversing the cylinder from the position shown in Fig. 7, the pockets 29 will be rendered operative. A plurality of cylinders with different sized pockets may be provided in accordance with the range of equipment necessary.

The cylinder 24 is provided with feathers 30 which take into correspondingly formed feather-ways with which a sprocket sleeve 31 is provided. The sprocket sleeve 31 is loosely journaled at 32 in one side of the body 17 and has integrally or otherwise fixedly secured thereto a sprocket wheel 33. A chain 34 is trained over the sprocket wheels 6 and 33 to impart rotative movement to the latter. In order to retain sprocket wheel 33 from moving to the left of Fig. 7, I provide a bracket 35 which may be pivoted at 36 on the body 17 so as to be swung laterally from the position shown in Fig. 1. To the bracket 35 is secured a spindle 36 which extends into and forms an internal journal for the sleeve 31. Thus when the bracket 35 is adjusted outwardly or laterally, the spindle will be withdrawn from the sleeve 31 so that the latter can be removed. A set-nut or other means may be provided for preventing movement of the cylinder 24 to the right of Fig. 7. A seeding or drill tube 37 is shown secured to the block 17 by bolts 38 in a manner to receive the seed discharged from portion 23. On the toe of the drill tube 37 I form a lug 39 for attachment to said tube of an improved furrow opening earth spreading shoe which I will now describe in detail.

My improved furrow opening shoe is shown in detail in Fig. 4 and comprises a body portion 40 having diverging or rearwardly extending sides 41. The body portion 40 is drilled at 42 so that a bolt or screw 43 may be inserted to anchor the furrow opening shoe to the drill tube. In order to provide for additional security of anchorage for the furrow opening shoe and to permit the same to be moved out of operative position when detached from the drill tube, I provide the furrow opening shoe with arms 44 having orifices 45 to receive the ends of the axle 2 so as to relieve the seeder body of any draft. By reference to Fig. 2, it will be seen how the furrow opening shoe may be shifted into an inoperative position.

The furrow opening shoe serves to guard the toe of the drill tube from contact with stumps or stones as the furrow opening shoe will ride over the same or deflect such obstructions laterally of the drill tube, where such obstructions are movable. Furthermore, the diverging sides 41 serve to spread the earth so that the seeds dropped by the drill tube will be deposited below the surface. As the implement is advanced, the divided soil acted upon by the furrow opening shoe will return and cover the deposited seeds. A gage roller 46 is mounted to follow the drill shoes and is peripherally and annularly grooved so as not only to prevent the shoes from sinking too deeply into the earth but also to cover the furrow formed by the shoes. I have shown the roller 46 journaled in a bracket 47 and the latter is secured at 48 to a hanger 49. The hanger 49 is shown more particularly in Fig. 8 and is provided with a slot 50 extending downwardly from its upper end. A set screw 51 extends through the slot 50 and into the tie-bar 19 to provide for adjustment of the roller 46 to any desired gaged position. When a plow, rake, etc., are used, the seed block 17 may be removed and the desired form of implement may be attached to the hanger 49.

It is believed that the novelty and utility of my invention will be fully understood from the foregoing description, and while I have herein shown and described one specific form of my invention, I do not wish to be limited thereto except for such limitations as the claims may import.

I claim:—

1. In a drill or seeder of the class described, a drill body having intake and discharge portions and cylinder journaling faces there between and opening laterally of said body, a cylinder adapted for endwise insertion in journaled relation with said faces and said body having a gage abutment face limiting movement of said cylinder, said cylinder having pockets arranged to be exposed for ingress of seed thereto through said intake portion when the cylinder is engaged against said abutment face, a sleeve rotatable in said body and keyed to said cylinder and provided with a sprocket wheel, a retaining spindle entering said sleeve, and means for fixing the retaining means to said body, substantially as described.

2. In a drill or seeder, a drill body having intake and discharge portions, a cylinder rotatively mounted in said body between said portions and adapted to be reversibly positioned therein, said cylinder having rows of seed pockets for communication with said portions dependent upon the manner in which the cylinder is inserted, and means non-rotatively connectible with said cylinder selectively adapted for rotating the same irrespective of the position in which the cylinder is disposed when inserted, substantially as described.

In testimony that I claim the foregoing as my own I hereby affixed my signature in the presence of two subscribing witnesses.

JOHN A. DAVIS.

Witnesses:
HAROLD SCANTLEHER,
EDNA BROYLES.

Copies of this patent may be obtained for five cents each, by addressing the "Commissioner of Patents. Washington, D. C."